United States Patent
Park et al.

(10) Patent No.: US 9,870,085 B2
(45) Date of Patent: Jan. 16, 2018

(54) POINTER CONTROL METHOD AND ELECTRONIC DEVICE THEREOF

(71) Applicant: Samsung Electronics Co., Ltd., Suwon-si, Gyeonggi-do (KR)

(72) Inventors: Jung-Chul Park, Yongin-si (KR); Young-Tae Jin, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 336 days.

(21) Appl. No.: 14/082,745

(22) Filed: Nov. 18, 2013

(65) Prior Publication Data

US 2014/0139464 A1 May 22, 2014

(30) Foreign Application Priority Data

Nov. 20, 2012 (KR) ........................ 10-2012-0131641

(51) Int. Cl.
 *G06F 3/0481* (2013.01)
 *G06F 3/041* (2006.01)
 *G06F 3/0488* (2013.01)

(52) U.S. Cl.
 CPC ........ *G06F 3/0416* (2013.01); *G06F 3/04883* (2013.01); *G06F 2203/04808* (2013.01)

(58) Field of Classification Search
 CPC ..... G06F 3/0481; G06F 3/0416; G06F 3/0488
 See application file for complete search history.

(56) References Cited

U.S. PATENT DOCUMENTS

| | | | |
|---|---|---|---|
| 2006/0244735 A1* | 11/2006 | Wilson | G06F 3/0488 345/173 |
| 2010/0283750 A1 | 11/2010 | Kang et al. | |
| 2011/0018806 A1* | 1/2011 | Yano | G06F 3/0488 345/163 |
| 2011/0050613 A1 | 3/2011 | Jiang et al. | |
| 2012/0056840 A1* | 3/2012 | Benko | G06F 3/0488 345/173 |
| 2012/0062484 A1 | 3/2012 | Gao et al. | |
| 2013/0167062 A1* | 6/2013 | Herring | G06F 3/04883 715/773 |
| 2013/0201106 A1* | 8/2013 | Naccache | G06F 3/0481 345/158 |

FOREIGN PATENT DOCUMENTS

| | | |
|---|---|---|
| CN | 101951254 A | 1/2011 |
| EP | 1852774 A2 | 4/2007 |
| EP | 1881398 A1 | 1/2008 |
| KR | 10-2008-0066416 A | 7/2008 |
| KR | 10-2010-0104884 A | 9/2010 |
| KR | 10-2011-0064337 A1 | 6/2011 |
| WO | 2012022769 A2 | 2/2012 |

* cited by examiner

*Primary Examiner* — Amare Mengistu
*Assistant Examiner* — Shawna Stepp Jones
(74) *Attorney, Agent, or Firm* — Jefferson IP Law, LLP

(57) ABSTRACT

A pointer control method and an apparatus in an electronic device are provided. The pointer control method in the electronic device includes detecting a multi touch, determining a coordinate of a pointer based on the multi-touched points, and displaying the pointer at the determined coordinate.

18 Claims, 11 Drawing Sheets

POINTER CONTROL METHOD AND ELECTRONIC DEVICE THEREOF

CROSS-REFERENCE TO RELATED APPLICATION(S)

This application claims the benefit under 35 U.S.C. §119(a) of a Korean patent application filed on Nov. 20, 2012 in the Korean Intellectual Property Office and assigned Serial No. 10-2012-0131641, the entire disclosure of which is hereby incorporated by reference.

TECHNICAL FIELD

The present disclosure relate to electronic devices. More particularly the present disclosure relates to methods and systems for controlling a pointer on a touch screen of an electronic device.

BACKGROUND

As the use of multimedia service using a portable electronic device increases, the amount of information quantity to process and to display in the portable electronic device are increasing. Accordingly, increased attention is being paid to portable electronic devices with a touch screen capable of improving space utilization to increase the size of a display unit.

The touch screen is an input/output device carrying out input and display of information on one screen. Accordingly, a touch screen in a portable electronic device can allow an increased display area by removing a separate input device such as a keypad.

A sensitivity method for the touch screen can include a resistive film method, a capacitive method, an infrared method, and an ultrasonic method. The capacitive method senses the change of capacitance through the touch screen to detect a coordinate. Particularly, the capacitive method has an advantage of supporting high durability, fast response time, high transmittance, and multi-touch. Accordingly, the use of the touch screen of the capacitive method in the portable electronic device has increased in recent years.

However, when performing a touch input with a finger, a user has difficulty recognizing a coordinate because the touch point is obscured by the finger, therefore the user is unable to precisely touch the desired coordinate. Also, when performing the touch input using a stylus pen, the user can perform the touch input more precisely, but there is the risk of losing the stylus pen and the like while carrying the stylus pen.

Accordingly, there is a need for a user interface capable of easily recognizing a coordinate and enabling a fine touch in an electronic device with a touch screen.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a pointer control method and apparatus for displaying a pointer based on multi-touch information in an electronic device.

Another aspect of the present disclosure is to provide a pointer control method and apparatus for determining a coordinate to display a pointer based on multi-touch information in an electronic device.

The above aspects are achieved by providing a pointer control method and an electronic device thereof.

In accordance with an aspect of the present disclosure, a pointer control method in an electronic device is provided. The method includes detecting a multi-touch, determining a coordinate of a pointer based on the multi-touched points, and displaying the pointer at the determined coordinate.

In accordance with another aspect of the present disclosure, a pointer control apparatus is provided. The apparatus includes at one processor for executing computer programs, at least one memory for storing data and instructions, and at least one program stored in the memory and configured to be executable by the at least one processor. The program includes at least one instruction of detecting a multi-touch, determining a coordinate of a pointer based on the multi-touched points, and displaying the pointer at the determined coordinate.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of various embodiments of the present disclosure will be more apparent from the following description taken in conjunction with the accompanying drawings in which.

The same reference numerals are used to represent the same elements throughout the drawings.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The present disclosure describes a technology for controlling a pointer in an electronic device.

In the following description, the electronic device can include a mobile communication terminal with a touch screen, a Portable Digital Assistant (PDA), a laptop computer, a smartphone, a netbook, a television, a Mobile Internet Device (MID), an Ultra Mobile Personal Computer (UMPC), a tablet Personal Computer (PC), a navigator, an MPEG Audio Layer-3 (MP3) player, and the like.

Figure 1:
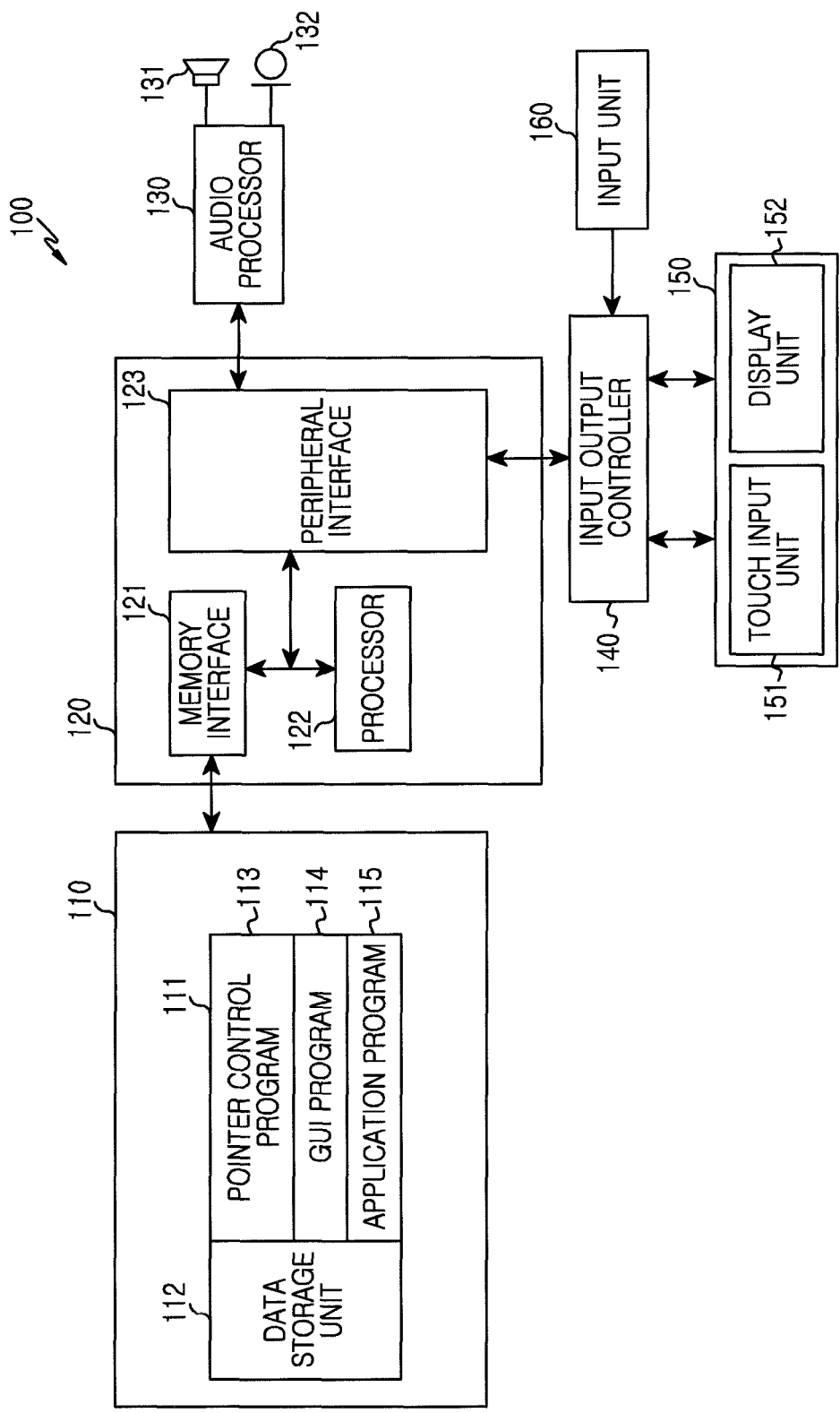
FIG. 1 is a block diagram illustrating a construction of an electronic device according to an embodiment of the present disclosure.

FIG. 1 is a block diagram illustrating a construction of an electronic device according to an embodiment of the present disclosure.

Referring to FIG. 1, the electronic device 100 can include a memory 110, a processor unit 120, an audio processor 130, an input output controller 140, a touch screen 150, and an input unit 160. Here, the memory 110 may exist in plural.

Each constituent element is described as follows.

The memory 110 can include a program storage unit 111 storing a program for controlling the operation of the electronic device 100 and a data storage unit 112 storing data generated during program execution. In an implementation, the program storage unit 111 may include a pointer control program 113, a Graphical User Interface (GUI) program 114, and at least one application program 115. In an implementation, the program included in the program storage unit 111 may be a set of instructions, and may be expressed as an instruction set.

Figure 3A:
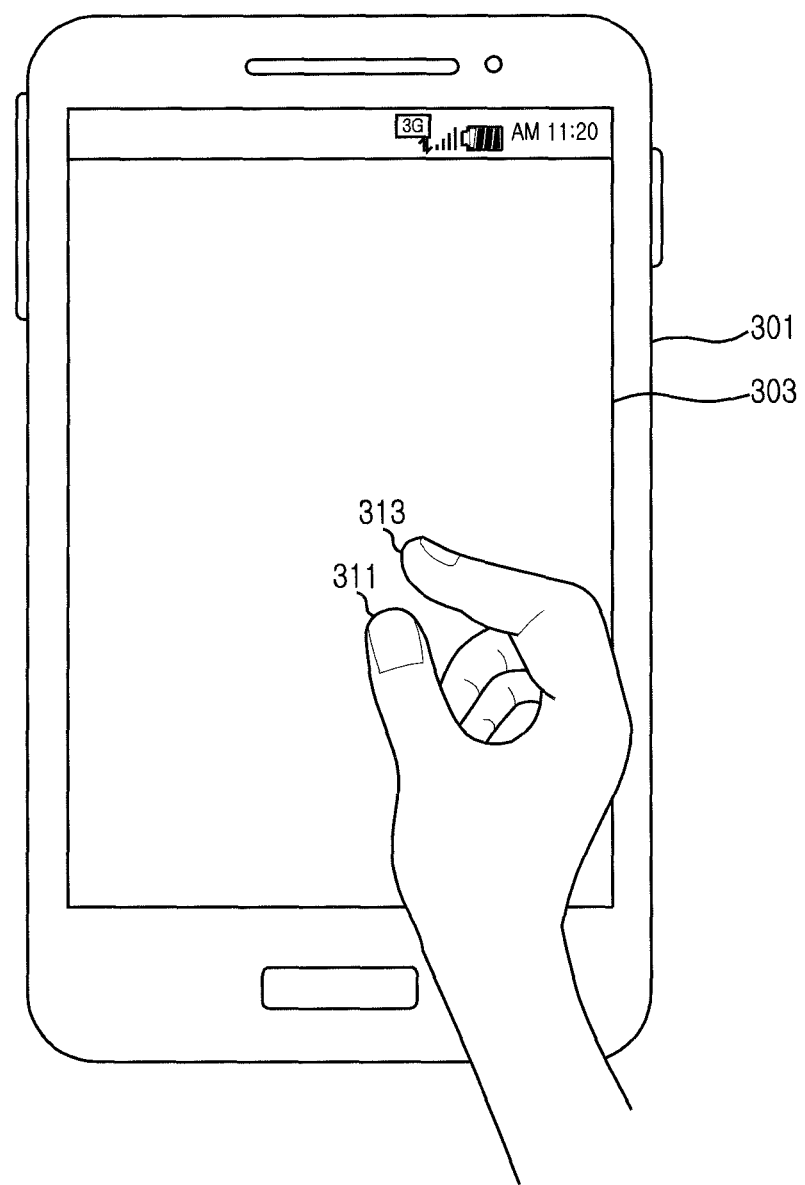
FIGS. 3A, 3B, and 3C are diagrams illustrating a screen configuration for displaying a pointer in an electronic device according to an embodiment of the present disclosure.
Figure 3B:
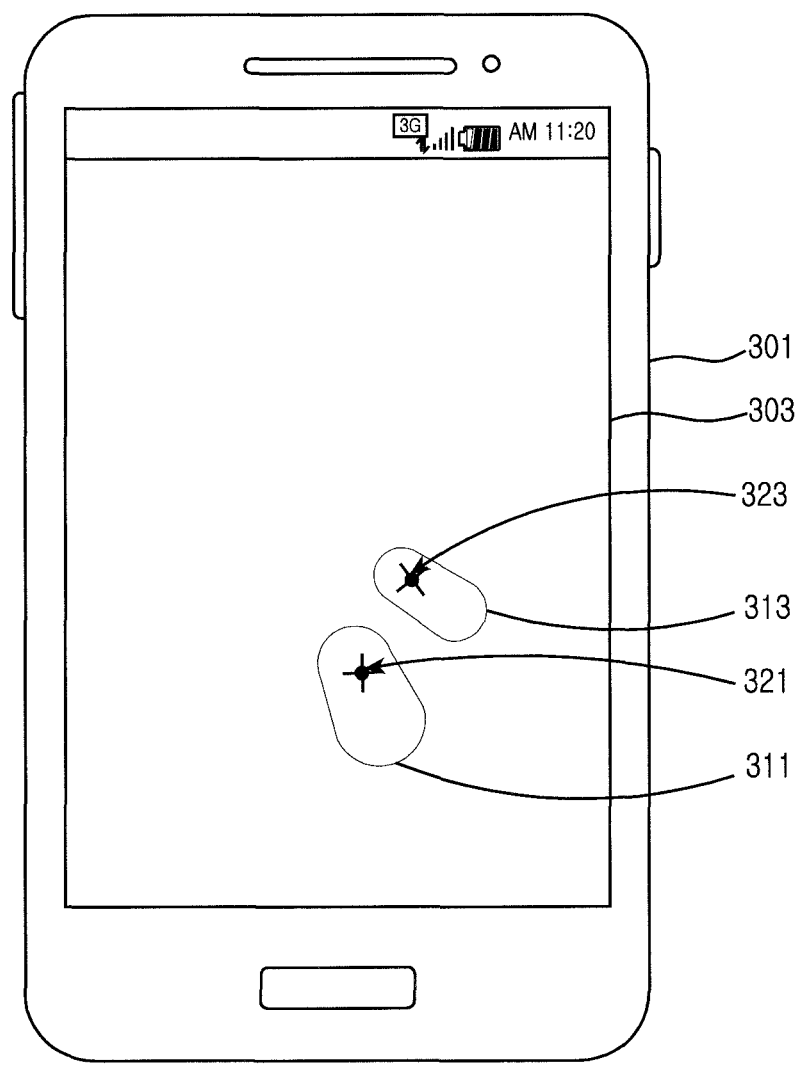
Figure 3C:
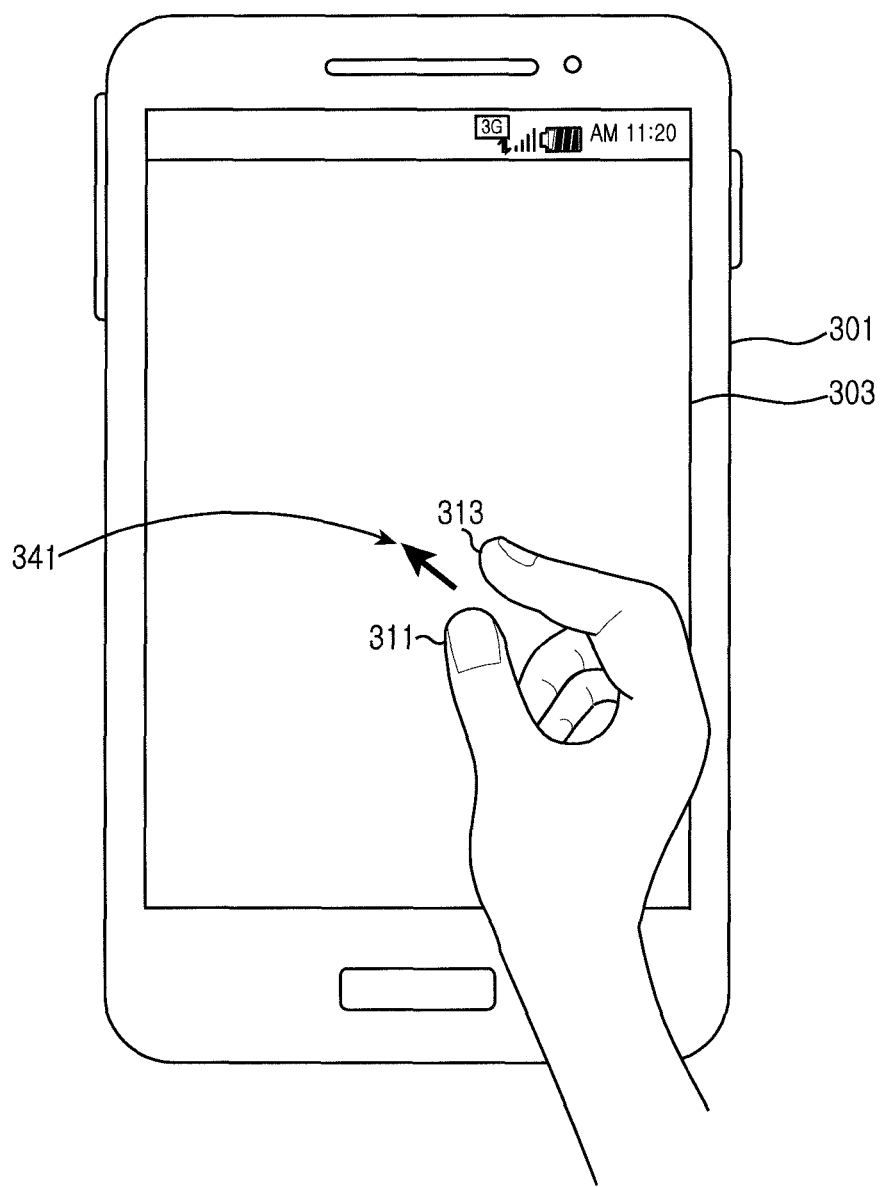
Figure 4A:
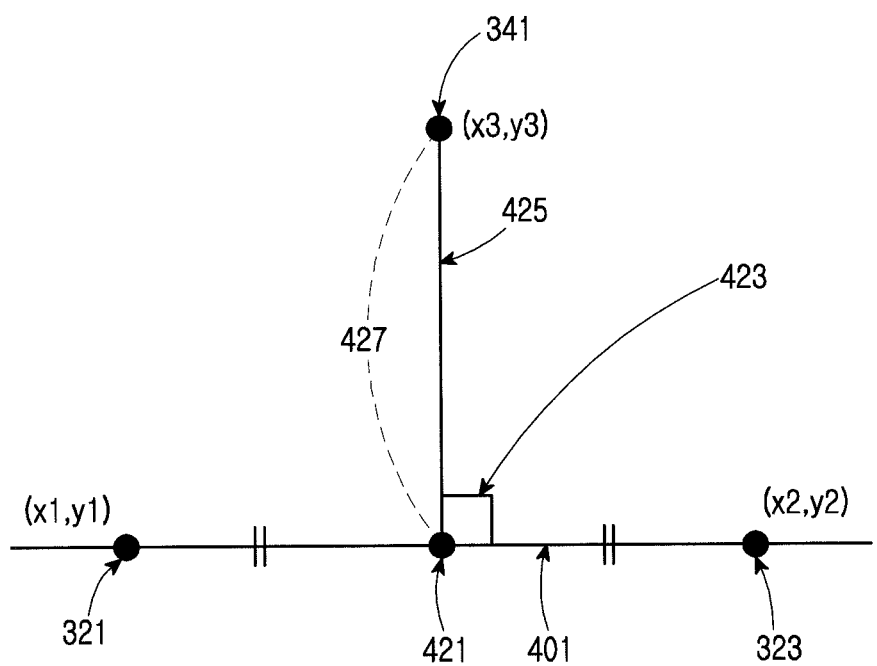
FIGS. 4A, 4B, and 4C are diagrams illustrating a procedure for determining a coordinate for displaying a pointer by using information of a multi-touch in an electronic device according to an embodiment of the present disclosure.

The pointer control program 113 can include at least one software constituent element for determining a coordinate to display a pointer based on a multi-touch sensed through a touch input unit 151. For example, as illustrated in FIG. 4A, the pointer control program 113 determines a coordinate for displaying a virtual pointer 341 in a predefined spaced distance 427 of a virtual line segment 425, which is at right angle 423 to a center point 421 of a 1st line segment 401 connecting a 1st coordinate 321 and a 2nd coordinate 323. In an implementation, as illustrated in FIGS. 3A to 3C, the pointer control program 113 can determine the directionality of a touch surface of a 1st point 311 and a touch surface of a 2nd point 313, and determine as the coordinate to display the virtual pointer 341 an intersection point located in the direction of combining the direction of the 1st point 311 and the 2nd point 313. In this implementation, it is assumed that, if the touch surface is of an oval, the directionality on the touch surface corresponds to the direction of the longest line segment within the touch surface. Also, the pointer control program 113 may determine a direction to display the coordinate of the virtual pointer 341 based on touch areas of the 1st point 311 and the 2nd point 313. In this implementation, the predefined spaced distance 427 can be set by a user or set by a system.

Figure 4B:
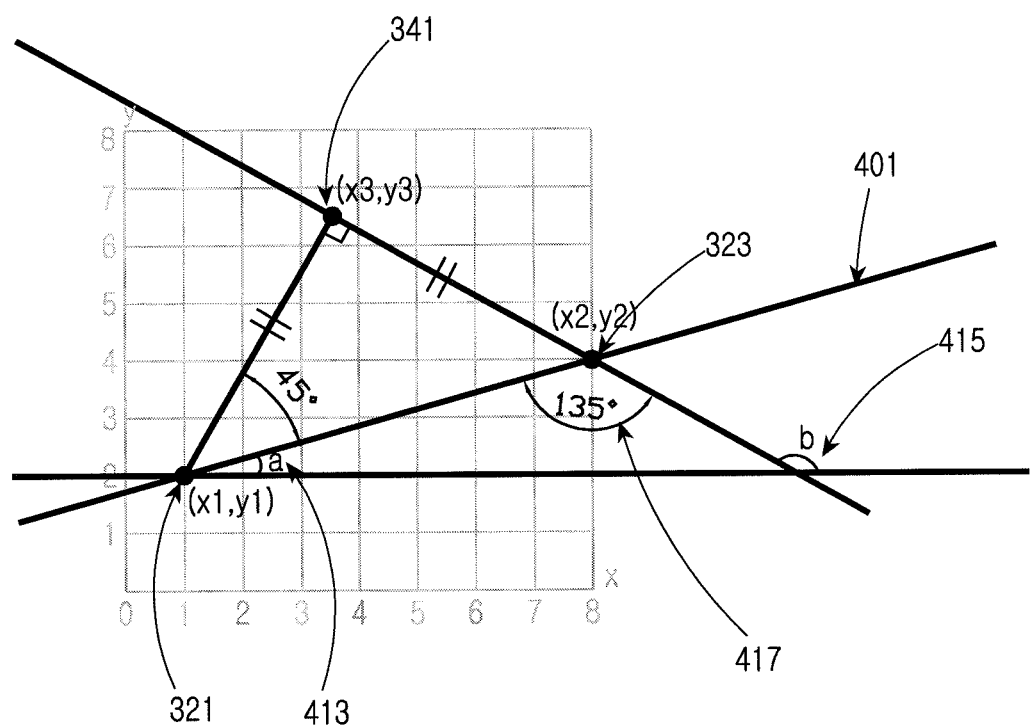

In another embodiment consistent with the present disclosure, as illustrated in FIG. 4B, the pointer control program 113 calculates a virtual 1st line segment 401 passing through both a 1st coordinate 321 of a 1st point 311 and a 2nd coordinate 323 of a 2nd point 313. After that, the pointer control program 113 obtains ∠a 413 by applying the arctangent to a slope of the 1st line segment 401 as given in Equation (1) below.

$$\angle a = a\tan\frac{(y_2 - y_1)}{(x_2 - x_1)} \quad (1)$$

In Equation (1) above, the '$x_1$' can include an X-axis coordinate of the 1st coordinate 321, the '$x_2$' can include an X-axis coordinate of the 2nd coordinate 323, the '$y_1$' can include a Y-axis coordinate of the 1st coordinate 321, and the '$y_2$' can include a Y-axis coordinate of the 2nd coordinate 323.

Assuming that the 1st coordinate 321 is equal to (1, 2) and the 2nd coordinate 323 is equal to (8, 4), the pointer control program 113 can calculate: ∠a=a tan(2/7).

After calculating the ∠a 413, the pointer control program 113 calculates ∠b 415 by using the ∠a 413. For example, the pointer control program 113 can calculate ∠b (415)=135° (417)+∠a (413). According to this, the pointer control program 113 provides simultaneous equations by using the ∠a 413 and the ∠b 415 as given in Equation (2) and Equation (3) below.

$$y_3 - y_1 = \tan(45° + \angle a)(x_3 - x_1) \quad (2)$$

In Equation (2) above, the '$x_1$' can include the X-axis coordinate of the 1st coordinate 321, the '$x_3$' can include an X-axis coordinate of a virtual pointer 341, the '$y_1$' can include the Y-axis coordinate of the 1st coordinate 321, and the '$y_3$' can include a Y-axis coordinate of the virtual pointer 341.

$$y_3 - y_2 = \tan(\angle b)(x_3 - x_2) \quad (3)$$

In Equation (3) above, the '$x_2$' can include the X-axis coordinate of the 2nd coordinate 323, the '$x_3$' can include the X-axis coordinate of the virtual pointer 341, the '$y_2$' can include the Y-axis coordinate of the 2nd coordinate 323, and the '$y_3$' can include the Y-axis coordinate of the virtual pointer 341.

Next, the pointer control program 113 can calculate the coordinate ($x_3$, $y_3$) of the virtual pointer 341 by computing Equation (2) and Equation (3). Assuming that the 1st coordinate 321 is equal to (1, 2) and the 2nd coordinate 323 is equal to (8, 4), the pointer control program 113 can calculate (3.500, 6.499) as the coordinate ($x_3$, $y_3$) of the virtual pointer 341. In an exemplary embodiment, as illustrated in FIGS. 3A to 3C, the pointer control program 113 can determine directionality on a touch surface of the 1st point 311 and a touch surface of the 2nd point 313, and determine as the coordinate to display the virtual pointer 341 an intersection point located in the direction of combining the direction of the 1st point 311 and the 2nd point 313. Here, it is assumed that, if the touch surface is of an oval, the directionality on the touch surface corresponds to the direction of the longest line segment within the touch surface. Also, the pointer control program 113 may determine direction to display the coordinate of the virtual pointer 341 based on touch areas of the 1st point 311 and the 2nd point 313.

Figure 4C:
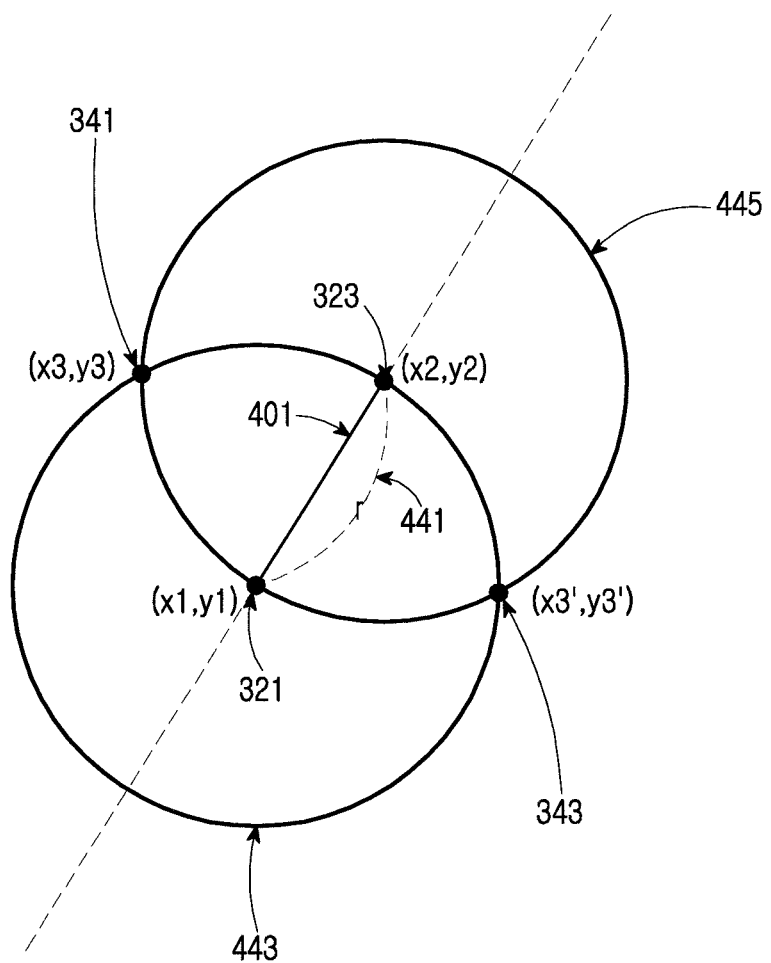

In yet another embodiment consistent with the present disclosure, as illustrated in FIG. 4C, the pointer control program 113 calculates a virtual 1st line segment 401 passing through both a 1st coordinate 321 of a 1st point 311 and a 2nd coordinate 323 of a 2nd point 313. Next, the pointer control program 113 calculates a 1st circle 443 whose center is at the 1st coordinate 321 and whose radius is a 2nd line segment 441. Also, the pointer control program 113 calculates a 2nd circle 445 whose center is at the 2nd coordinate 323 and whose radius is the 2nd line segment 441. The pointer control program 113 determines as a coordinate to display a virtual pointer any one intersection point among intersection points 341 and 343 of the 1st circle 443 and the 2nd circle 445. In an implementation, as illustrated in FIGS. 3A to 3C, the pointer control program 113 can determine the directionality on a touch surface of the 1st point 311 and a touch surface of the 2nd point 313, and determine as the coordinate to display the virtual pointer an intersection point located in the direction of combining the direction of the 1st point 311 and the 2nd point 313. In this implementation, it is assumed that, if the touch surface is of an oval, the directionality on the touch surface corresponds to the direction of the longest line segment within the touch surface. Also, the pointer control program 113 may determine direction to display the coordinate of the virtual pointer based on touch areas of the 1st point 311 and the 2nd point 313.

The GUI program 114 can include at least one software constituent element for providing a user interface by graphic on a display unit 152. For example, the GUI program 114 controls a pointer on the display unit 152 based on a coordinate determined by the pointer control program 113.

The application program 115 can include a software constituent element for at least one application program installed in the electronic device 100.

The processor unit 120 can include a memory interface 121, at least one processor 122, and a peripheral interface 123. In an implementation, the memory interface 121, the at least one processor 122, and the peripheral interface 123, which are included in the processor unit 120, can be integrated as at least one integrated circuit or realized as a separate constituent element.

The memory interface 121 controls the access of a constituent element such as the processor 122 or the peripheral interface 123 to the memory 110.

The peripheral interface 123 controls the connection of the processor 122 and the memory interface 121 with an input output peripheral device of the electronic device 100.

Figure 2:
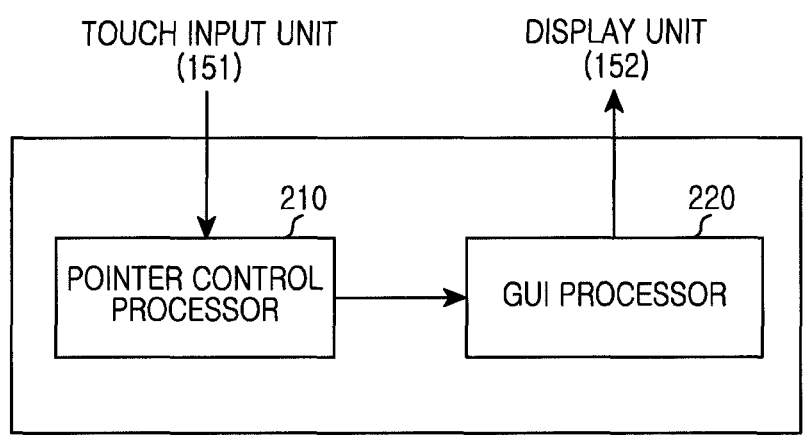
FIG. 2 is a block diagram illustrating a construction of a processor according to an embodiment of the present disclosure.

The processor 122 controls the electronic device 100 to provide a variety of multimedia services by using at least one software program. The processor 122 controls to execute at least one program stored in the memory 110 and provide a service according to a corresponding program. For instance, the processor 122 can be constructed as illustrated in FIG. 2 to execute the pointer control program 113 and control a pointer in the electronic device.

The audio processor 130 provides an audio interface between a user and the electronic device 100 through a speaker 131 and a microphone 132.

The input output controller 140 provides an interface between an input/output device, such as the touch screen 150, the input unit 160 and the like, and the peripheral interface 123.

The touch screen 150, an input/output device performing output of information and input of information, can include the touch input unit 151 and the display unit 152.

The touch input unit 151 provides touch information sensed through a touch panel, to the processor unit 120 through the input output controller 140. In an embodiment, the touch input unit 151 provides touch information generated by an electronic pen or a finger, to the processor unit 120 through the input output controller 140.

The display unit 152 displays status information of the electronic device 100, a character input by a user, a moving picture, a still picture and the like. For example, the display unit 152 displays a pointer by the GUI program 114.

The input unit 160 provides input data generated by user's selection, to the processor unit 120 through the input output controller 140. For example, the input unit 160 is constructed including only a control button for control of the electronic device 100. For another example, the input unit 160 may be composed of a keypad for receiving provision of input data from a user.

Though not illustrated, the electronic device 100 may further include a communication system performing a communication function for voice communication and data communication. The communication system may be distinguished into a plurality of communication sub modules supporting different communication networks. For example, the communication network can include, though not limited to, a Global System for Mobile Communication (GSM) network, an Enhanced Data GSM Environment (EDGE) network, a Code Division Multiple Access (CDMA) network, a Wireless-Code Division Multiple Access (W-CDMA) network, a Long Term Evolution (LTE) network, an Orthogonal Frequency Division Multiple Access (OFDMA) network, a Wireless Fidelity (Wi-Fi) network, a Bluetooth network, and a Near Field Communication (NFC) network.

FIG. 2 is a block diagram illustrating a construction of a processor according to an embodiment of the present disclosure.

Referring to FIG. 2, the processor 122 can include a pointer control processor 210 and a graphical user interface processor 220.

The pointer control processor 210 executes the pointer control program 113 of the program storage unit 111 and determines a coordinate to display a pointer based on information of a multi-touch sensed through the touch input unit 151. For example, as illustrated in FIG. 4A, the pointer control processor 210 determines a coordinate for displaying a virtual pointer 341 in a predefined spaced distance 427 of a virtual line segment 425, which is at right angle 423 to a center point 421 of a 1st line segment 401 connecting a 1st coordinate 321 and a 2nd coordinate 323. In an embodiment, as illustrated in FIGS. 3A to 3C, the pointer control processor 210 can determine the directionality on a touch surface of a 1st point 311 and a touch surface of a 2nd point 313, and determine as the coordinate to display the virtual pointer 341 an intersection point located in the direction of combining the direction of the 1st point 311 and the 2nd point 313. Here, it is assumed that, if the touch surface is of an oval, the directionality on the touch surface corresponds to the direction of the longest line segment within the touch surface. Also, the pointer control processor 210 may determine in which direction to display the coordinate of the virtual pointer 341 based on touch areas of the 1st point 311 and the 2nd point 313. In an implementation, the predefined spaced distance 427 can be set by a user or set by a system.

In various embodiments, as illustrated in FIG. 4B, the pointer control processor 210 calculates a virtual 1st line segment 401 passing both a 1st coordinate 321 of a 1st point 311 and a 2nd coordinate 323 of a 2nd point 313. After that, the pointer control processor 210 obtains ∠a 413 by applying the arctangent to a slope of the 1st line segment 401 as given in Equation (1) above. For example, assuming that the 1st coordinate 321 is equal to (1, 2) and the 2nd coordinate 323 is equal to (8, 4), the pointer control processor 210 can calculate: ∠a=a tan(2/7).

After calculating the ∠a 413, the pointer control processor 210 calculates ∠b 415 by using the ∠a 413. For example, the pointer control processor 210 can calculate: ∠b (415)= 135° (417)+∠a (413). According to this, the pointer control processor 210 provides simultaneous equations by using the ∠a 413 and the ∠b 415 as given in Equation (2) and Equation (3) above. Next, the pointer control processor 210 can calculate the coordinate ($x_3$, $y_3$) of the virtual pointer 341 by computing Equation (2) and Equation (3). Assuming that the 1st coordinate 321 is equal to (1, 2) and the 2nd coordinate 323 is equal to (8, 4), the pointer control processor 210 can calculate (3.500, 6.499) as the coordinate ($x_3$, $y_3$) of the virtual pointer 341. In an embodiment, as illustrated in FIGS. 3A to 3C, the pointer control processor 210 can determine the directionality on a touch surface of the 1st point 311 and a touch surface of the 2nd point 313, and determine as the coordinate to display the virtual pointer 341 an intersection point located in the direction of combining the direction of the 1st point 311 and the 2nd point 313. Here, it is assumed that, if the touch surface is of an oval, the directionality on the touch surface corresponds to the direction of the longest line segment within the touch surface. Also, the pointer control processor 210 may determine in which direction to display the coordinate of the virtual pointer 341 based on touch areas of the 1st point 311 and the 2nd point 313.

In various embodiments, as illustrated in FIG. 4C, the pointer control processor 210 calculates a virtual 1st line segment 401 passing both a 1st coordinate 321 of a 1st point 311 and a 2nd coordinate 323 of a 2nd point 313. Next, the pointer control processor 210 calculates a 1st circle 443 whose center is at the 1st coordinate 321 and whose radius is a 2nd line segment 441. Also, the pointer control processor 210 calculates a 2nd circle 445 whose center is at the 2nd coordinate 323 and whose radius is the 2nd line segment 441. The pointer control processor 210 determines as a coordinate to display a virtual pointer any one intersection point among intersection points 341 and 343 of the 1st circle 443 and the 2nd circle 445. For example, as illustrated in FIGS. 3A to 3C, the pointer control processor 210 can determine the directionality on a touch surface of the 1st point 311 and a touch surface of the 2nd point 313, and determine as the coordinate to display the virtual pointer an intersection point located in the direction of combining the direction of the 1st point 311 and the 2nd point 313. Here, it is assumed that, if the touch surface is of an oval, the directionality on the touch surface corresponds to the direction of the longest line segment within the touch surface. Also, the pointer control processor 210 may determine direction to display the coordinate of the virtual pointer based on touch areas of the 1st point 311 and the 2nd point 313.

The GUI processor 220 executes the GUI program 114 of the program storage unit 111 and provides a user interface by graphic on the display unit 152. For instance, the GUI processor 220 controls to display a virtual pointer on the display unit 152 based on a coordinate determined by the pointer control processor 210.

In the aforementioned embodiments, the electronic device 100 can include, in the program storage unit 111, the pointer control program 113 and the GUI program 114 for displaying a pointer based on information of a multi-touch in the electronic device with the touch screen. According to this, the electronic device 100 executes the program included in the program storage unit 111 by the processor 122 constructed as in FIG. 2, and displays the pointer based on multi-touch information.

In another embodiment, the electronic device 100 may control the display of a pointer based on multi-touch information by using the processor 122 including pointer control program 113 and GUI program 114 information. In an implementation, the processor 122 constructed as in FIG. 2 may include each of the pointer control program 113 and GUI program 114 information.

In the aforementioned embodiment, the electronic device 100 may include the pointer control processor 210 including the pointer control program 113 in order to control the pointer.

In another embodiment, the electronic device may include a separate pointer control processor including the pointer control program 113.

FIGS. 3A, 3B, and 3C illustrate a screen configuration for displaying a pointer in an electronic device according to an embodiment of the present disclosure.

Referring to FIG. 3A, the electronic device 301 can include a mobile communication terminal with a touch screen 303, a PDA, a laptop computer, a smartphone, a netbook, a television, a MID, a UMPC, a tablet PC, a navigator, and an MP3 player.

If a multi-touch for a 1st point 311 and a 2nd point 313 are sensed through the touch screen 303, the electronic device 301 detects each touch information about the 1st point 311 and the 2nd point 313 sensed through the touch screen 303. For example, as illustrated in FIG. 3B, the electronic device 301 detects a 1st coordinate 321 and a 2nd coordinate 323 for the 1st point 311 and the 2nd point 313 of the multi-touch sensed through the touch screen 303, respectively. Also, the electronic device 301 detects each touch surface of the 1st point 311 and the 2nd point 313 of the multi-touch sensed through the touch screen 303.

After detecting each touch information about the 1st point 311 and the 2nd point 313, as illustrated in FIG. 3C, the electronic device displays a virtual pointer 341 on the touch screen 303. In an embodiment, a method of identifying a coordinate for displaying the virtual pointer 341 by using each touch information about the 1st point 311 and the 2nd point 313 is described with reference to FIGS. 4A to 4C below.

FIGS. 4A, 4B, 4C, and 4C illustrate a procedure for determining a coordinate for displaying a pointer by using information about a multi-touch in an electronic device according to an embodiment of the present disclosure.

Referring to FIG. 4A, the electronic device 301 calculates a virtual line segment 401 passing through both a 1st coordinate 321 of a 1st point 311 and a 2nd coordinate 323 of a 2nd point 313. In one implementation, as illustrated in FIG. 4A, the electronic device 301 determines a coordinate for displaying a virtual pointer 341 in a predefined spaced distance 427 of a virtual line segment 425, which is at right angle 423 to a center point 421 of the 1st line segment 401. Here, the predefined spaced distance 427 can be set by a user or set by a system. In an embodiment, as illustrated in FIGS. 3A to 3C, the electronic device 301 can determine the directionality on a touch surface of the 1st point 311 and a touch surface of the 2nd point 313, and determine as the coordinate to display the virtual pointer 341 an intersection point located in the direction of combining the direction of the 1st point 311 and the 2nd point 313. In this implementation, it is assumed that, if the touch surface is of an oval, the directionality on the touch surface corresponds to the direction of the longest line segment within the touch surface. Also, the electronic device 301 may determine in which direction to display the coordinate of the virtual pointer 341 based on touch areas of the 1st point 311 and the 2nd point 313.

Referring to FIG. 4B, the electronic device 301 calculates a virtual 1st line segment 401 passing through both a 1st coordinate 321 of a 1st point 311 and a 2nd coordinate 323 of a 2nd point 313. After that, the electronic device 301 obtains ∠a 413 by applying the arctangent to a slope of the 1st line segment 401 as given in Equation (1) above. For example, assuming that the 1st coordinate 321 is equal to (1, 2) and the 2nd coordinate 323 is equal to (8, 4), the electronic device 301 can calculate: ∠a=a tan(2/7).

After calculating the ∠a 413, the electronic device 301 calculates ∠b 415 by using the ∠a 413. For example, the electronic device 301 can calculate ∠b (415)=135° (417)+ ∠a (413). According to this, the electronic device 301 provides simultaneous equations by using the ∠a 413 and the ∠b 415 as given in Equation (2) and Equation (3) above.

The electronic device 301 can calculate the coordinate $(x_3, y_3)$ of the virtual pointer 341 by computing Equation (2) and Equation (3). Assuming that the 1st coordinate 321 is equal to (1, 2) and the 2nd coordinate 323 is equal to (8, 4), the electronic device 301 can calculate (3.500, 6.499) being the coordinate $(x_3, y_3)$ of the virtual pointer 341. In an embodiment, as illustrated in FIGS. 3A to 3C, the electronic device 301 can determine the directionality on a touch surface of the 1st point 311 and a touch surface of the 2nd point 313, and determine as the coordinate to display the virtual pointer 341 an intersection point located in the direction of combining the direction of the 1st point 311 and the 2nd point 313. In this implementation, it is assumed that, if the touch surface is of an oval, the directionality on the touch surface corresponds to the direction of the longest line segment within the touch surface. Also, the electronic device 301 may determine in which direction to display the coordinate of the virtual pointer 341 based on touch areas of the 1st point 311 and the 2nd point 313.

Referring to FIG. 4C, the electronic device 301 calculates a virtual 1st line segment 401 passing through both a 1st coordinate 321 of a 1st point 311 and a 2nd coordinate 323 of a 2nd point 313. Next, the electronic device 301 calculates a 1st circle 443 whose center is at the 1st coordinate 321 and whose radius is a 2nd line segment 441. Also, the electronic device 301 calculates a 2nd circle 445 whose center is at the 2nd coordinate 323 and whose radius is the 2nd line segment 441. The electronic device 301 determines as a coordinate to display a virtual pointer any one intersection point among intersection points 341 and 343 of the 1st circle 443 and the 2nd circle 445. In an embodiment, as illustrated in FIGS. 3A to 3C, the electronic device 301 can determine the directionality on a touch surface of the 1st point 311 and a touch surface of the 2nd point 313, and determine as the coordinate to display the virtual pointer an intersection point located in the direction of combining the direction of the 1st point 311 and the 2nd point 313. In an implementation, it is assumed that, if the touch surface is of an oval, the directionality on the touch surface corresponds to the direction of the longest line segment within the touch surface. Also, the electronic device 301 may determine in which direction to display the coordinate of the virtual pointer based on touch areas of the 1st point 311 and the 2nd point 313.

Figure 5A:
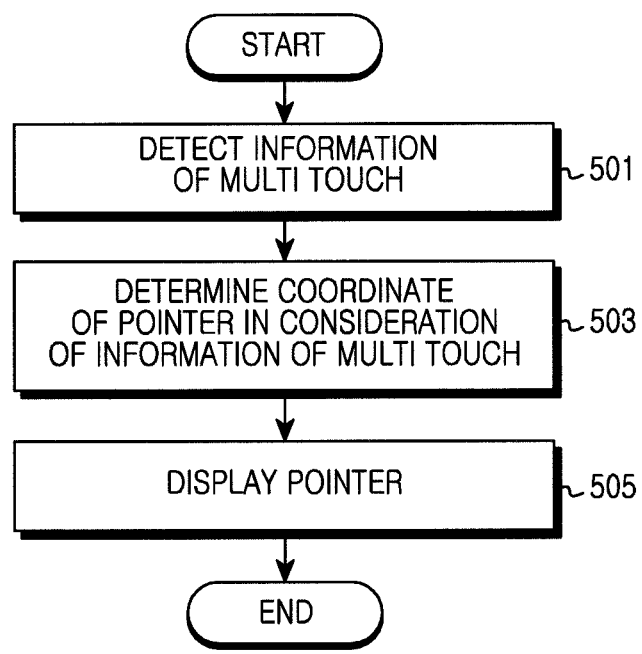
FIG. 5A is a flowchart illustrating a procedure for displaying a virtual pointer based on a multi-touch in an electronic device according to an embodiment of the present disclosure.

FIG. 5A illustrates a procedure for displaying a virtual pointer based on a multi-touch in an electronic device according to an embodiment of the present disclosure.

Referring to FIG. 5A, at operation 501, the electronic device 301 detects information corresponding to a multi-touch through a touch screen. For example, if a multi-touch for a 1st point 311 and a 2nd point 313 is sensed through a touch screen 303 as illustrated in FIG. 3A, the electronic device 301 detects a 1st coordinate 321 and a 2nd coordinate 323 for the 1st point 311 and the 2nd point 313 of the multi-touch sensed through the touch screen 303, respectively. Also, the electronic device 301 detects each touch surface of the 1st point 311 and the 2nd point 313 of the multi-touch sensed through the touch screen 303.

After detecting the information of the multi-touch, the electronic device 301 proceeds to operation 503 and determines a coordinate to display a pointer based on the information of the multi-touch. In an implementation, as illustrated in FIG. 4A, the electronic device 301 determines a coordinate for displaying a virtual pointer 341 in a predefined spaced distance 427 of a virtual line segment 425, which is at right angle 423 to a center point 421 of a 1st line segment 401 connecting a 1st coordinate 321 and a 2nd coordinate 323. In an embodiment, the electronic device 301 can determine the directionality on a touch surface of a 1st point 311 and a touch surface of a 2nd point 313, and determine as the coordinate to display the virtual pointer 341 an intersection point located in the direction of combining the direction of the 1st point 311 and the 2nd point 313. Here, it is assumed that, if the touch surface is of an oval, the directionality on the touch surface corresponds to the direction of the longest line segment within the touch surface. Also, the electronic device 301 may determine in which direction to display the coordinate of the virtual pointer 341 based on touch areas of the 1st point 311 and the 2nd point 313. A threshold distance 427 between the two points may be set by a user or set by a system.

In another embodiment, as illustrated in FIG. 4B, the electronic device 301 calculates a virtual 1st line segment 401 passing through both a 1st coordinate 321 of a 1st point 311 and a 2nd coordinate 323 of a 2nd point 313. After that, the electronic device 301 obtains ∠a 413 by applying the arctangent to a slope of the 1st line segment 401 as given in Equation (1) above. Here, assuming that the 1st coordinate 321 is equal to (1, 2) and the 2nd coordinate 323 is equal to (8, 4), the electronic device 301 can calculate: ∠a=arc tan(2/7).

After calculating the ∠a 413, the electronic device 301 calculates ∠b 415 by using the ∠a 413. For example, the electronic device 301 can calculate ∠b (415)=135° (417)+ ∠a (413). According to this, the electronic device 301 provides simultaneous equations by using the ∠a 413 and the ∠b 415 as given in Equation (2) and Equation (3) above. The electronic device 301 can calculate the coordinate $(x_3, y_3)$ of the virtual pointer 341 by computing Equation (2) and Equation (3). Assuming that the 1st coordinate 321 is equal to (1, 2) and the 2nd coordinate 323 is equal to (8, 4), the electronic device 301 can calculate (3.500, 6.499) as the coordinate $(x_3, y_3)$ of the virtual pointer 341. In an embodiment, the electronic device 301 can determine the directionality on a touch surface of the 1st point 311 and a touch surface of the 2nd point 313, and determine as the coordinate to display the virtual pointer 341 an intersection point located in the direction of combining the direction of the 1st point 311 and the 2nd point 313. Here, it is assumed that, if the touch surface is of an oval, the directionality on the touch surface corresponds to the direction of the longest line segment within the touch surface. Also, the electronic device 301 may determine in which direction to display the coordinate of the virtual pointer 341 based on touch areas of the 1st point 311 and the 2nd point 313.

In yet another embodiment, as illustrated in FIG. 4C, the electronic device 301 calculates a virtual 1st line segment 401 passing through both a 1st coordinate 321 of a 1st point 311 and a 2nd coordinate 323 of a 2nd point 313. Next, the electronic device 301 calculates a 1st circle 443 whose center is at the 1st coordinate 321 and whose radius is a 2nd line segment 441. Also, the electronic device 301 calculates a 2nd circle 445 whose center is at the 2nd coordinate 323 and whose radius is the 2nd line segment 441. The electronic device 301 determines as a coordinate to display a virtual pointer any one intersection point among intersection points 341 and 343 of the 1st circle 443 and the 2nd circle 445. In an embodiment, the electronic device 301 can determine the directionality on a touch surface of the 1st point 311 and a touch surface of the 2nd point 313, and determine as the coordinate to display the virtual pointer an intersection point located in the direction of combining the direction of the 1st point 311 and the 2nd point 313. In this implementation, it is assumed that, if the touch surface is of an oval, the directionality on the touch surface corresponds to the direction of the longest line segment within the touch surface. Also, the electronic device 301 may determine in which direction to display the coordinate of the virtual pointer based on touch areas of the 1st point 311 and the 2nd point 313.

After determining the coordinate to display the pointer based on the multi-touch information, the electronic device 301 proceeds to operation 505 and displays the pointer at the determined coordinate. For example, as illustrated in FIG. 3C, the electronic device 301 displays the virtual pointer 341 on the touch screen 303.

Next, the electronic device terminates an algorithm consistent with the present disclosure.

Figure 5B:
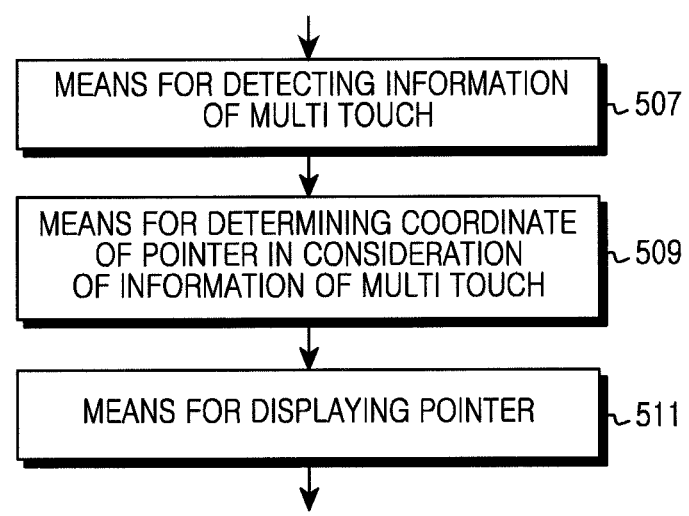
FIG. 5B is a diagram illustrating a construction of an electronic device for displaying a virtual pointer based on a multi-touch according to an embodiment of the present disclosure.

Each process for displaying a virtual pointer based on a multi-touch in an electronic device as above may be constructed as an apparatus for displaying a virtual pointer based on a multi-touch in an electronic device as illustrated in FIG. 5B.

FIG. 5B illustrates a construction of an electronic device for displaying a virtual pointer based on a multi-touch according to an embodiment of the present disclosure.

Referring to FIG. 5B, the electronic device can include a 1st means 507 for detecting information of a multi-touch, a 2nd means 509 for determining a pointer coordinate based on the information of the multi-touch, and a 3rd means 511 for displaying a pointer at the determined coordinate.

The 1st means 507 detects information of a multi-touch through a touch screen. For example, if a multi-touch for a 1st point 311 and a 2nd point 313 is sensed through a touch screen 303 as illustrated in FIG. 3A, the electronic device 301 detects a 1st coordinate 321 and a 2nd coordinate 323 for the 1st point 311 and the 2nd point 313 of the multi-touch sensed through the touch screen 303, respectively. Also, the electronic device 301 detects each touch surface of the 1st point 311 and the 2nd point 313 of the multi-touch sensed through the touch screen 303.

The 2nd means 509 determines a coordinate to display a pointer based on the information of the multi-touch. In an implementation, as illustrated in FIG. 4A, the electronic device 301 determines a coordinate for displaying a virtual pointer 341 in a predefined spaced distance 427 of a virtual line segment 425, which is at right angle 423 to a center point 421 of a 1st line segment 401 connecting a 1st coordinate 321 and a 2nd coordinate 323. In an embodiment, the electronic device 301 can determine the directionality on a touch surface of the 1st point 311 and a touch surface of the 2nd point 313, and determine as the coordinate to display the virtual pointer 341 an intersection point located in the direction of combining the direction of the 1st point 311 and the 2nd point 313. Here, it is assumed that, if the touch surface is of an oval, the directionality the touch surface corresponds to the direction of the longest line segment within the touch surface. Also, the electronic device 301 may determine in which direction to display the coordinate of the virtual pointer 341 based on touch areas of the 1st point 311 and the 2nd point 313. The predefined spaced distance 427 can be set by a user or set by a system.

In another embodiment, as illustrated in FIG. 4B, the electronic device 301 calculates a virtual 1st line segment 401 passing through both a 1st coordinate 321 of a 1st point 311 and a 2nd coordinate 323 of a 2nd point 313. After that, the electronic device 301 obtains $\angle a$ 413 by applying the arctangent to a slope of the 1st line segment 401 as given in Equation (1) above. Assuming that the 1st coordinate 321 is equal to (1, 2) and the 2nd coordinate 323 is equal to (8, 4), the electronic device 301 can calculate: $\angle a = a\tan(2/7)$.

After calculating the $\angle a$ 413, the electronic device 301 calculates $\angle b$ 415 by using the $\angle a$ 413. For example, the electronic device 301 can calculate $\angle b$ (415)=135° (417)+ $\angle a$ (413). According to this, the electronic device 301 provides simultaneous equations by using the $\angle a$ 413 and the $\angle b$ 415 as given in Equation (2) and Equation (3) above. Next, the electronic device 301 can calculate the coordinate $(x_3, y_3)$ of the virtual pointer 341 by computing Equation (2) and Equation (3). Assuming that the 1st coordinate 321 is equal to (1, 2) and the 2nd coordinate 323 is equal to (8, 4), the electronic device 301 can calculate (3.500, 6.499) as the coordinate $(x_3, y_3)$ of the virtual pointer 341. In an embodiment, the electronic device 301 can determine the directionality on a touch surface of the 1st point 311 and a touch surface of the 2nd point 313, and determine as the coordinate to display the virtual pointer 341 an intersection point located in the direction of combining the direction of the 1st point 311 and the 2nd point 313. In this implementation, it is assumed that, if the touch surface is of an oval, the directionality on the touch surface corresponds to the direction of the longest line segment within the touch surface. Also, the electronic device 301 may determine in which direction to display the coordinate of the virtual pointer 341 based on touch areas of the 1st point 311 and the 2nd point 313.

In an implementation, as illustrated in FIG. 4C, the electronic device 301 calculates a virtual 1st line segment 401 passing through both a 1st coordinate 321 of a 1st point 311 and a 2nd coordinate 323 of a 2nd point 313. Next, the electronic device 301 calculates a 1st circle 443 whose center is at the 1st coordinate 321 and whose radius is a 2nd line segment 441. Also, the electronic device 301 calculates a 2nd circle 445 whose center is at the 2nd coordinate 323 and whose radius is the 2nd line segment 441. At this time, the electronic device 301 determines as a coordinate to display a virtual pointer any one intersection point among intersection points 341 and 343 of the 1st circle 443 and the 2nd circle 445. In an embodiment, the electronic device 301 can determine the directionality on a touch surface of the 1st point 311 and a touch surface of the 2nd point 313, and determine as the coordinate to display the virtual pointer an intersection point located in the direction of combining the direction of the 1st point 311 and the 2nd point 313. In this implementation, it is assumed that, if the touch surface is of an oval, the directionality of the touch surface corresponds to the direction of the longest line segment within the touch surface. Also, the electronic device 301 may determine in which direction to display the coordinate of the virtual pointer based on touch areas of the 1st point 311 and the 2nd point 313.

The 3rd means 511 displays the pointer at the determined coordinate. For example, as illustrated in FIG. 3C, the electronic device 301 displays the virtual pointer 341 on the touch screen 303.

As described above, the electronic device can include the respective means for displaying the virtual pointer based on the multi-touch. In an embodiment, the respective means for displaying the virtual pointer based on the multi touch in the electronic device may be constructed as one means.

Figure 6:
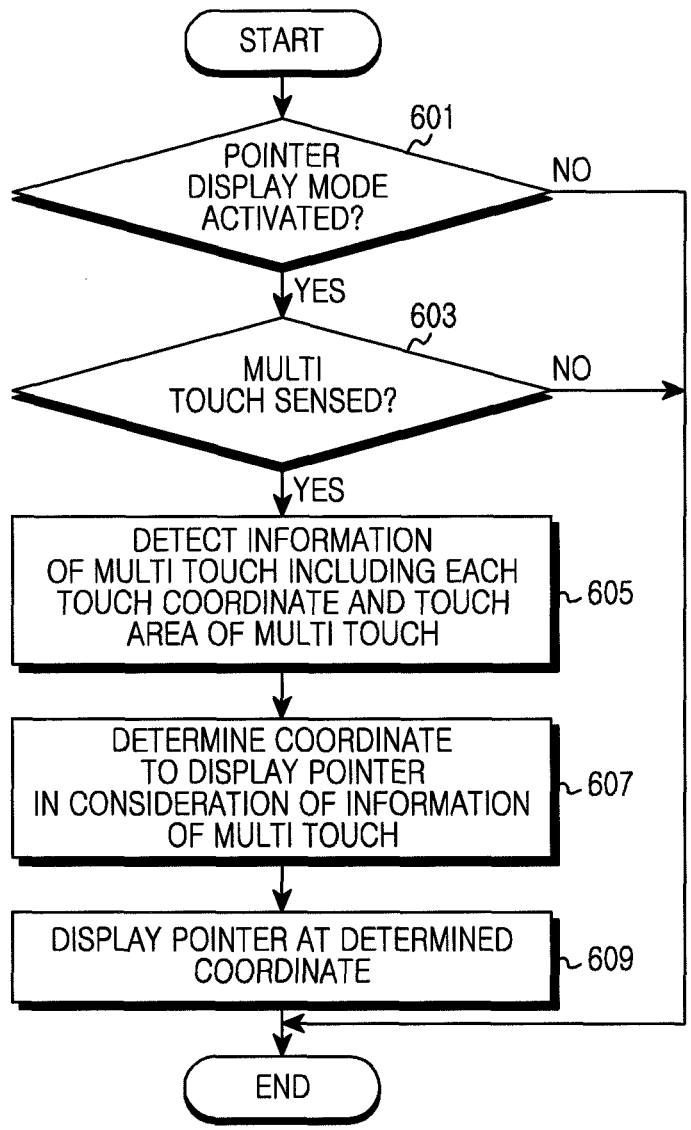
FIG. 6 is a flowchart illustrating a procedure for displaying a virtual pointer based on a multi-touch in an electronic device according to an embodiment of the present disclosure.

FIG. 6 illustrates a procedure for displaying a virtual pointer based on a multi-touch in an electronic device according another embodiment of the present disclosure.

Referring to FIG. 6, at operation 601, the electronic device identifies whether a pointer display mode is activated. For example, the electronic device identifies whether an icon for pointer display mode driving is selected. In another example, the electronic device may identify whether a pointer display mode driving event takes place based on input information of a hardware button. In yet another example, the electronic device may identify whether the pointer display mode driving event takes place based on the input information of the hardware button and motion information of the electronic device. In yet another example, the electronic device may identify whether the pointer display mode driving event takes place based on touch information for a touch screen. In a further example, the electronic device may identify whether the pointer display mode driving event takes place based on the touch information for the touch screen and the motion information of the electronic device. If the pointer display mode is not activated in the electronic device at operation 601, the electronic device terminates an algorithm consistent with the present disclosure.

If the pointer display mode is activated at operation 601, the electronic device proceeds to operation 603 and identifies if a multi-touch is sensed through the touch screen. For example, as illustrated in FIG. 3A, the electronic device 301 identifies whether the multi-touch is sensed through a touch screen 303. If the multi-touch is not sensed through the touch screen at operation 603, the electronic device terminates an algorithm consistent with the present disclosure.

If sensing the multi-touch at operation 603, the electronic device proceeds at operation 605 and detects information of the multi-touch. For example, if a multi-touch for a 1st point 311 and a 2nd point 313 is sensed through the touch screen 303 as illustrated in FIG. 3A, the electronic device 301 detects a 1st coordinate 321 and a 2nd coordinate 323 for the 1st point 311 and the 2nd point 313 of the multi-touch sensed through the touch screen 303, respectively. Also, the electronic device 301 can detect each touch surface for the 1st point 311 and the 2nd point 313 of the multi-touch sensed through the touch screen 303.

After detecting the information of the multi-touch at operation 605, the electronic device proceeds at operation 607 and determines a coordinate to display a pointer based on the information of the multi-touch. For example, as illustrated in FIG. 4A, the electronic device 301 determines a coordinate for displaying a virtual pointer 341 in a threshold spaced distance 427 of a virtual line segment 425, which is at right angle 423 to a center point 421 of a 1st line segment 401 connecting a 1st coordinate 321 and a 2nd coordinate 323. In an embodiment, the electronic device 301 can determine the directionality on a touch surface of the 1st point 311 and a touch surface of the 2nd point 313, and determine as the coordinate to display the virtual pointer 341 an intersection point located in the direction of combining the direction of the 1st point 311 and the 2nd point 313. In this implementation, it is assumed that, if the touch surface is of an oval, the directionality on the touch surface corresponds to the direction of the longest line segment within the touch surface. Also, the electronic device 301 may determine in which direction to display the coordinate of the virtual pointer 341 based on touch areas of the 1st point 311 and the 2nd point 313. The threshold spaced distance 427 can be set by a user or set by a system.

In another implementation, as illustrated in FIG. 4B, the electronic device 301 calculates a virtual 1st line segment 401 passing both a 1st coordinate 321 of a 1st point 311 and a 2nd coordinate 323 of a 2nd point 313. After that, the electronic device 301 obtains $\angle a$ 413 by applying the arctangent to a slope of the 1st line segment 401 as given in Equation (1) above. Assuming that the 1st coordinate 321 is equal to (1, 2) and the 2nd coordinate 323 is equal to (8, 4), the electronic device 301 can calculate: $\angle a = a\tan(2/7)$.

After calculating the $\angle a$ 413, the electronic device 301 calculates $\angle b$ 415 by using the $\angle a$ 413. For example, the electronic device 301 can calculate $\angle b$ (415)=135° (417)+ $\angle a$ (413). Accordingly, the electronic device 301 can calculate a coordinate ($x_3$, $y_3$) of the virtual pointer 341 by using the 1st coordinate 321 and the 2nd coordinate 323. Assuming that the 1st coordinate 321 is equal to (1, 2) and the 2nd coordinate 323 is equal to (8, 4), the electronic device 301 can calculate (3.500, 6.499) being the coordinate ($x_3$, $y_3$) of the virtual pointer 341. In an embodiment, the electronic device 301 can determine the directionality on a touch surface of the 1st point 311 and a touch surface of the 2nd point 313, and determine as the coordinate to display the virtual pointer 341 an intersection point located in the direction of combining the direction of the 1st point 311 and the 2nd point 313. In this implementation, it is assumed that, if the touch surface is of an oval, the directionality on the touch surface corresponds to the direction of the longest line segment within the touch surface. Also, the electronic device 301 may determine direction to display the coordinate of the virtual pointer 341 based on touch areas of the 1st point 311 and the 2nd point 313.

In an implementation, as illustrated in FIG. 4C, the electronic device 301 calculates a virtual 1st line segment 401 passing through both a 1st coordinate 321 of a 1st point 311 and a 2nd coordinate 323 of a 2nd point 313. Next, the electronic device 301 calculates a 1st circle 443 whose center is at the 1st coordinate 321 and whose radius is a 2nd line segment 441. Also, the electronic device 301 calculates a 2nd circle 445 whose center is at the 2nd coordinate 323 and whose radius is the 2nd line segment 441. At this time, the electronic device 301 determines as a coordinate to display a virtual pointer any one intersection point among intersection points 341 and 343 of the 1st circle 443 and the 2nd circle 445. In an embodiment, the electronic device 301 can determine the directionality on a touch surface of the 1st point 311 and a touch surface of the 2nd point 313, and determine as the coordinate to display the virtual pointer an intersection point located in the direction of combining the direction of the 1st point 311 and the 2nd point 313. In this implementation, it is assumed that, if the touch surface is of an oval, the directionality on the touch surface corresponds to the direction of the longest line segment within the touch surface. Also, the electronic device 301 may determine in which direction to display the coordinate of the virtual pointer based on touch areas of the 1st point 311 and the 2nd point 313.

After determining the coordinate to display the pointer based on the information of the multi-touch at operation 607, the electronic device proceeds to operation 609 and displays the pointer at the determined coordinate. For example, as illustrated in FIG. 3C, the electronic device 301 displays a virtual pointer 341 on the touch screen 303.

Next, the electronic device terminates an algorithm consistent with the present disclosure.

As described above, various embodiments of the present disclosure have an advantage that a user of an electronic device can precisely handle the movement of a touch coordinate and a touch point is not obscured by a finger and the like, by displaying a pointer based on information of a multi-touch in the electronic device.

While the present disclosure has been shown and described with reference to various embodiments, it will be understood by those skilled in the art that various changes in form and details may be made therein without departing from the spirit and scope of the present disclosure as defined by the appended claims and their equivalents.

What is claimed is:

1. An operation method in an electronic device, the method comprising:
    detecting a multi-touch comprising a first point and a second point;
    determining a coordinate of a pointer based on multi-touched points of the detected multi-touch;
    determining a direction of the pointer based on the multi-touched points of the detected multi-touch; and
    displaying the pointer at the determined coordinate,
    wherein the determining of the coordinate and the direction of the pointer comprises:
        determining a first direction based on a touch surface of the first point,
        determining a second direction based on a touch surface of the second point,
        determining a direction of an intersection point of the first direction and the second direction as the direction of the pointer,
        determining a first line segment which passes the multi-touched first point and second point,
        determining a second line segment which passes the first point and is at a first reference angle to the first line segment in the direction of the second point,
        determining a third line segment which passes the second point and is at a second reference angle to the first line segment in the direction of the first point, and
        determining the intersection point of the second line segment and the third line segment, as the coordinate of the pointer.

2. The method of claim 1, wherein the determining of the coordinate of the pointer further comprises:
    determining a fourth line segment which is at a right angle to a center point of the first line segment; and
    determining the coordinate of the pointer based on coordinates spaced the reference distance apart from the center point of the first line segment among coordinates comprised in the fourth line segment.

3. The method of claim 2, wherein the determining of the coordinate of the pointer further comprises:
    determining a first virtual line based on a touch surface of the first point;
    determining a second virtual line based on a touch surface of the second point; and
    determining any one coordinate among the coordinates spaced the reference distance apart from the center point of the first line segment on the fourth line segment, as the coordinate of the pointer, based on the direction of an intersection point of the first virtual line and the second virtual line,
    wherein the first virtual line comprises a line segment comprising two points of which the distance is the longest among points constituting a border of the touch surface of the first point, and
    wherein the second virtual line comprises a line segment comprising two points of which the distance is the longest among points constituting a border of the touch surface of the second point.

4. The method of claim 2, wherein the determining of the coordinate of the pointer further comprises determining any one coordinate among the coordinates spaced the reference distance apart from the center point of the first line segment on the fourth line segment, as the coordinate of the pointer, based on a touch surface of the first point and a touch surface of the second point.

5. The method of claim 1, wherein the determining of the coordinate of the pointer further comprises:
    determining a first circle whose center is at the first point and whose radius is the first line segment;
    determining a second circle whose center is at the second point and whose radius is the first line segment; and
    determining any one of the intersection points of the first circle and the second circle, as the coordinate of the pointer.

6. The method of claim 5,
    wherein the determining of the coordinate of the pointer further comprises:
        determining a first virtual line based on a touch surface of the first point,
        determining a second virtual line based on of a touch surface of the second point, and
        determining any one of intersection points of the first circle and the second circle, as the coordinate of the pointer, based on the direction of an intersection point of the first virtual line and the second virtual line,
    wherein the first virtual line comprises a line segment comprising two points of which the distance is the longest among points constituting a border of the touch surface of the first point, and
    wherein the second virtual line comprises a line segment comprising two points of which the distance is the longest among points constituting a border of the touch surface of the second point.

7. The method of claim 5, wherein the determining of the coordinate of the pointer further comprises determining a coordinate of any one of the intersection points of the first circle and the second circle, as the coordinate of the pointer, based on a touch surface of the first point and a touch surface of the second point.

8. The method of claim 1, wherein the detecting of the multi-touch comprises detecting the multi-touch of a thumb and a forefinger.

9. The method of claim 1, further comprising, after the displaying of the pointer, changing a coordinate of the displayed pointer according to a change of coordinates of the multi-touched points.

10. An electronic device comprising:
at least one processor configured to execute computer programs;
at least one non-transitory memory configured to store data and instructions; and
at least one program configured to be stored in the at least one non-transitory memory and configured to be executable by the at least one processor,
wherein upon execution, the at least one program configures the at least one processor to:
detect a multi-touch comprising a first point and a second point,
determine a coordinate of a pointer based on the multi-touched points of the detected multi-touch,
determine a direction of the pointer based on the multi-touched points of the detected multi-touch, and
display the pointer at the determined coordinate,
wherein the determining of the coordinate and the direction of the pointer comprises:
determining a first direction based on a touch surface of the first point,
determining a second direction based on a touch surface of the second point,
determining a direction of an intersection point of the first direction and the second direction as the direction of the pointer,
determining a first line segment which passes the multi-touched first point and second point,
determining a second line segment which passes the first point and is at a first reference angle to the first line segment in the direction of the second point,
determining a third line segment which passes the second point and is at a second reference angle to the first line segment in the direction of the first point, and
determining the intersection point of the second line segment and the third line segment, as the coordinate of the pointer.

11. The electronic device of claim 10, wherein the detecting of the multi-touch comprises detecting the multi-touch of a thumb and a forefinger.

12. The electronic device of claim 10, wherein the program further comprises processor-executable instructions for performing operations of, after displaying the pointer, changing a coordinate of the displayed pointer according to a change of coordinates of the multi-touched points.

13. An electronic device comprising:
at least one processor configured to execute computer programs;
at least one non-transitory memory configured to store data and instructions; and
at least one program configured to be stored in the at least one non-transitory memory and configured to be executable by the at least one processor,
wherein upon execution, the at least one program configures the at least one processor to:
detect a multi-touch comprising a first point and a second point,
determine a coordinate of a pointer based on the multi-touched points of the detected multi-touch,
determine a direction of the pointer based on the multi-touched points of the detected multi-touch, and
display the pointer at the determined coordinate, and
wherein the determining of the coordinate and the direction of the pointer comprises:
determining a first direction based on a touch surface of the first point,
determining a second direction based on a touch surface of the second point,
determining a direction of an intersection point of the first direction and the second direction as the direction of the pointer,
determining a first line segment which passes the multi-touched first point and second point,
determining a second line segment which is at a right angle to a center point of the first line segment, and
determining the coordinate of the pointer based on coordinates spaced the reference distance apart from the center point of the first line segment among coordinates comprised in the second line segment.

14. The electronic device of claim 13, wherein the determining of the coordinate of the pointer further comprises:
determining a first virtual line based on a touch surface of the first point,
determining a second virtual line based on a touch surface of the second point, and
determining any one coordinate among the coordinates spaced the reference distance apart from the center point of the first line segment on the second line segment, as the coordinate of the pointer, based on of the direction of an intersection point of the first virtual line and the second virtual line,
wherein the first virtual line comprises a line segment comprising two points of which the distance is the longest among points constituting a border of the touch surface of the first point, and
wherein the second virtual line comprises a line segment comprising two points of which the distance is the longest among points constituting a border of the touch surface of the second point.

15. The electronic device of claim 13, wherein the determining of the coordinate of the pointer further comprises determining any one coordinate among the coordinates spaced the reference distance apart from the center point of the first line segment on the second line segment, as the coordinate of the pointer, based on a touch surface of the first point and a touch surface of the second point.

16. An electronic device comprising:
at least one processor configured to execute computer programs;
at least one non-transitory memory configured to store data and instructions; and
at least one program configured to be stored in the at least one non-transitory memory and configured to be executable by the at least one processor,
wherein upon execution, the at least one program configures the at least one processor to:
detect a multi-touch comprising a first point and a second point,
determine a coordinate of a pointer based on the multi-touched points of the detected multi-touch,
determine a direction of the pointer based on the multi-touched points of the detected multi-touch, and
display the pointer at the determined coordinate, and
wherein the determining of the coordinate and the direction of the pointer comprises:
determining a first direction based on a touch surface of the first point,
determining a second direction based on a touch surface of the second point, determining a direction of an intersection point of the first direction and the second direction as the direction of the pointer, determining a first line segment which passes the multi-touched first point and second point, determining a first circle whose center is at the first point and whose radius is the first line segment, determining a second circle whose center is at the second point and whose radius is the first line segment, and determining any one of the intersection points of the first circle and the second circle, as the coordinate of the pointer.

17. The electronic device of claim 16, wherein the determining of the coordinate of the pointer further comprises:

determining a first virtual line based on a touch surface of the first point, determining a second virtual line based on a touch surface of the second point, and determining any one of intersection points of the first circle and the second circle, as the coordinate of the pointer, based on the direction of an intersection point of the first virtual line and the second virtual line, wherein the first virtual line comprises a line segment comprising two points of which the distance is the longest among points constituting a border of the touch surface of the first point, and wherein the second virtual line comprises a line segment comprising two points of which the distance is the longest among points constituting a border of the touch surface of the second point.

18. The electronic device of claim 16, wherein the determining of the coordinate of the pointer further comprises determining a coordinate of any one of the intersection points of the first circle and the second circle, as the coordinate of the pointer, based on a touch surface of the first point and a touch surface of the second point.

* * * * *